United States Patent
Uchida

(10) Patent No.: US 8,925,960 B2
(45) Date of Patent: Jan. 6, 2015

(54) VEHICLE CEILING STRUCTURE

(71) Applicant: Toyota Boshoku Kabushiki Kaisha, Aichi-ken (JP)

(72) Inventor: Yasunori Uchida, Aichi-ken (JP)

(73) Assignee: Toyota Boshoku Kabushiku Kaisha, Aichi-Ken (JP)

( * ) Notice: Subject to any disclaimer, the term of this patent is extended or adjusted under 35 U.S.C. 154(b) by 0 days.

(21) Appl. No.: 14/043,227

(22) Filed: Oct. 1, 2013

(65) Prior Publication Data

US 2014/0110974 A1    Apr. 24, 2014

(30) Foreign Application Priority Data

Oct. 23, 2012 (JP) .................. 2012-234190

(51) Int. Cl.
*B60R 21/213* (2011.01)
*B60R 13/02* (2006.01)
*B60N 3/02* (2006.01)

(52) U.S. Cl.
CPC ........... *B60R 13/0212* (2013.01); *B60R 21/213* (2013.01); *B60N 3/026* (2013.01); *B60R 2013/0287* (2013.01)
USPC ...................... 280/730.2; 280/728.3; 296/1.02

(58) Field of Classification Search
CPC .. B60R 21/213; B60R 21/217; B60R 21/215; B60R 21/232; B60R 21/2165; B60R 21/214; B60R 13/0212; B60N 3/02
USPC ......... 280/730.2, 728.3, 728.2; 296/1.02, 214
See application file for complete search history.

(56) References Cited

U.S. PATENT DOCUMENTS

| 6,173,990 | B1 * | 1/2001 | Nakajima et al. | 280/730.2 |
|---|---|---|---|---|
| 6,364,343 | B1 * | 4/2002 | Slota et al. | 280/728.2 |
| 6,561,576 | B2 * | 5/2003 | Breymaier | 296/214 |
| 6,616,222 | B1 * | 9/2003 | Ponceau | 296/214 |
| 7,172,209 | B2 * | 2/2007 | Totani et al. | 280/728.2 |
| 7,651,143 | B2 * | 1/2010 | Spamer | 296/1.02 |
| 7,661,703 | B2 * | 2/2010 | Ono et al. | 280/730.2 |
| 7,775,549 | B2 * | 8/2010 | Einsiedel et al. | 280/728.2 |
| 7,780,190 | B2 * | 8/2010 | Yamagiwa et al. | 280/730.2 |
| 7,850,197 | B2 * | 12/2010 | Zucal et al. | 280/728.3 |
| 7,914,035 | B2 * | 3/2011 | Davey et al. | 280/728.2 |
| 8,317,221 | B2 * | 11/2012 | Hemingway | 280/728.2 |
| 2005/0052001 | A1 * | 3/2005 | Totani et al. | 280/728.2 |

FOREIGN PATENT DOCUMENTS

JP    2002-362283    12/2002

OTHER PUBLICATIONS

U.S. Appl. No. 14/043,204 to Yasunori Uchida, filed Oct. 1, 2013.

* cited by examiner

*Primary Examiner* — Ruth Ilan
(74) *Attorney, Agent, or Firm* — Greenblum & Bernstein, P.L.C.

(57) ABSTRACT

A vehicle ceiling structure includes a ceiling interior material that covers a curtain shield air bag with a terminal side, an assist grip is attached to a body panel through an attachment hole provided in the ceiling interior material and an attachment portion is provided on the assist grip. The attachment portion is in contact with or faces an outer circumference of the attachment hole in a surface of the ceiling interior material in a vehicle cabin side. The vehicle ceiling structure on a surface thereof in a vehicle cabin outer side, has an annular groove facing the outer circumference of the attachment portion such that the annular groove surrounds the attachment portion.

8 Claims, 5 Drawing Sheets

VEHICLE CEILING STRUCTURE

CROSS-REFERENCE TO RELATED APPLICATIONS

The present application claims priority under 35 U.S.C. §119 of Japanese Application No. 2012-234190 filed on Oct. 23, 2012, the disclosure of which is expressly incorporated by reference herein in its entirety.

BACKGROUND OF THE INVENTION

1. Field of the Invention

The present invention relates to a vehicle ceiling structure, and in particular, to a vehicle ceiling structure capable of preventing an excessive stress from concentrating on an assist grip at expansion of a curtain shield air bag, and improving the appearance of a ceiling interior material around the assist grip.

2. Description of the Related Art

For example, a conventionally-known vehicle ceiling structure as shown in FIG. 6A includes a ceiling interior material 103 that covers a curtain shield air bag 102 with a terminal side 103a; an assist grip 111 attached to a body panel 112 through attachment holes 109 formed in the ceiling interior material 103; and attachment portions 117 provided at the assist grip 111, the attachment portions 117 being in contact with the outer circumferences of the respective attachment holes 109 in a surface of the ceiling interior material 103 in a vehicle cabin side (Refer to, for example, Japanese Unexamined Patent Publication No. 2002-362283).

The above-mentioned patent document discloses, as shown in FIG. 6B, that a plurality of slits 120 extending outward from the edge of each of the attachment holes 109 is formed in the ceiling interior material 103. When the terminal side 103a of the ceiling interior material 103 opens toward the vehicle cabin side at expansion of the curtain shield air bag 102, the slits 120 split off to increase the diameter of the attachment holes 109, resulting in that the ceiling interior material 103 escapes from the attachment portions 117 of the assist grip 111.

However, according to the technique disclosed in the patent document, the ceiling interior material 103 has the plurality of slits 120 extending outward from the edge of the attachment holes 109. When the plurality of slits 120 does not uniformly split at expansion of the curtain shield air bag 102, the ceiling interior material 103 may caught with the attachment portions 117 of the assist grip 111, causing an excessive force to concentrate on the assist grip 111. Further, when the length of the slits 120 is set to be long to sufficiently increase the diameter of the attachment holes 109, for example, as shown in FIG. 7, at use of the assist grip 111, the slits 120 on the surface of the ceiling interior material 103 in the vehicle cabin side are seen from the vehicle cabin side, degrading the appearance around the assist grip 111.

SUMMARY OF THE INVENTION

In consideration of the current circumstances, an object of the present invention is to provide a vehicle ceiling structure capable of preventing an excessive stress from concentrating on an assist grip at expansion of a curtain shield air bag, and improving the appearance of a ceiling interior material around the assist grip.

One aspect of the present embodiments provides a vehicle ceiling structure comprising: a ceiling interior material that covers a curtain shield air bag with a terminal side; an assist grip attached to a body panel through an attachment hole formed in the ceiling interior material; and an attachment portion provided on the assist grip, the attachment portion being in contact with or facing to outer circumference of the attachment hole in a surface of the ceiling interior material in a vehicle cabin side, wherein the ceiling interior material on a surface thereof in a vehicle cabin outer side has an annular groove on outer circumference of the attachment portion in such a manner that the annular groove surround the attachment portion.

In a further aspect, the ceiling interior material on the surface thereof in a vehicle cabin outer side has a coupling groove for coupling the pair of annular grooves arranged on the outer circumferences of the pair of attachment portions provided at the assist grip.

In a further aspect, the coupling groove includes a first coupling groove for coupling the pair of annular grooves to each other on the terminal side of the ceiling interior material.

In a further aspect, the coupling groove includes the first coupling groove and a second coupling groove for coupling the pair of annular grooves to each other on the inner side of the ceiling interior material than the first coupling groove.

In the vehicle ceiling structure in this embodiment, since the ceiling interior material on the surface thereof in the vehicle cabin outer side has the annular groove on the outer circumference of the attachment portion of the assist grip in such a manner that the groove surround the attachment portion, when the terminal side of the ceiling interior material opens toward the vehicle cabin side at expansion of the curtain shield air bag, the ceiling interior material bends along the annular groove, and inner portion of the annular groove in the ceiling interior material bend toward the vehicle cabin outer side in a tubular fashion. Thereby, the attachment hole stably expands in diameter, causing the ceiling interior material to escape from the attachment portion of the assist grip smoothly. This can prevent an excessive stress from concentrating on the assist grip. Further, since the annular groove on the surface of the ceiling interior material in the vehicle cabin side is not seen from the vehicle cabin side, the appearance of the ceiling interior material around the assist grip can be improved.

In the case where the coupling groove for coupling the pair of annular grooves arranged on the outer circumferences of the pair of attachment portions provided at the assist grip are formed on the surface of the ceiling interior material in the vehicle cabin outer side, the ceiling interior material bends along the coupling groove, thereby bending the ceiling interior material along the pair of annular grooves. Thus, the pair of attachment holes further stably expand in diameter, causing the ceiling interior material to escape from the pair of attachment portions of the assist grip more smoothly.

In the case where the coupling groove includes the first coupling groove for coupling the pair of annular grooves to each other on the terminal side of the ceiling interior material, the ceiling interior material easily bend about the first coupling groove, and further bends along the pair of annular grooves more reliably.

In the case where the coupling groove includes the first coupling groove and the second coupling groove for coupling the pair of annular grooves to each other on the inner side of the ceiling interior material than the first coupling groove, the ceiling interior material bend along the first coupling groove as well as the second coupling groove. Thus, at expansion of the air bag, the bending stress that cannot be received by the first coupling groove can be supplementarily received by the second coupling groove.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 4A shows the state where an assist grip is stored, and FIG. 4B shows the state where the assist grip is used.

FIG. 5A shows the mode including partially broken annular grooves, FIG. 5B shows the mode including a partially broken coupling groove, FIG. 5C shows the mode including a single coupling groove, and FIG. 5D shows the mode including only annular grooves.

FIG. 6A is a vertical sectional view showing the state where an air bag is expanded, and FIG. 6B is an enlarged view of the ceiling interior material with respect to the arrow b in FIG. 6A.

DESCRIPTION OF THE PREFERRED EMBODIMENT

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Figure 2:
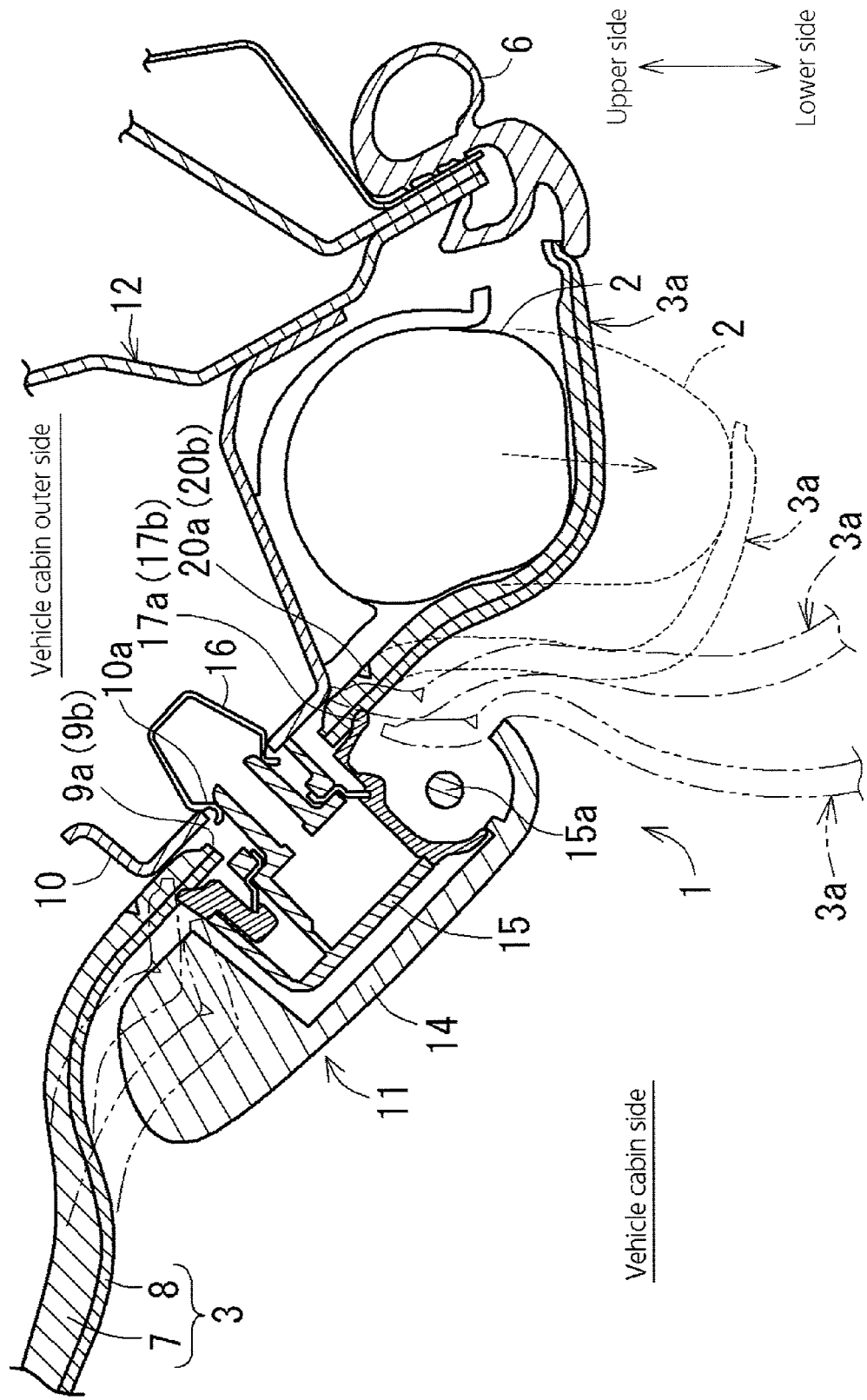
FIG. 2 is an enlarged sectional view taken along a line II-II in FIG. 1.
Figure 3:
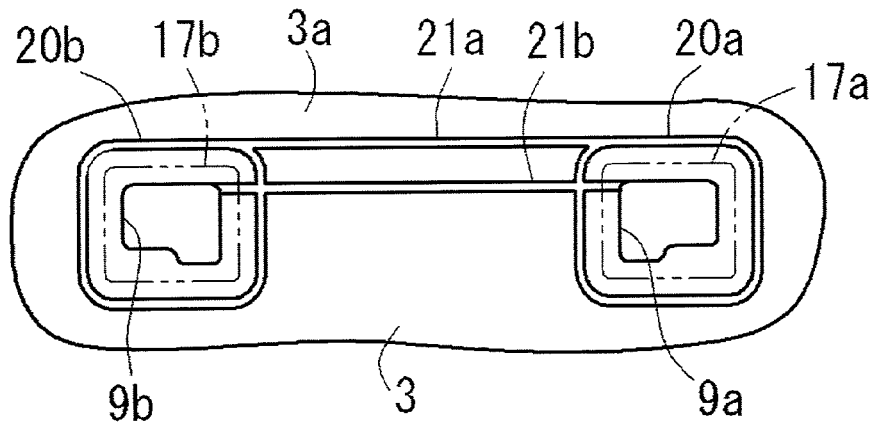
FIG. 3 is a plan view of a main part of a ceiling interior material in accordance with the working example when viewed from the vehicle cabin outer side.

A vehicle ceiling structure in accordance with this embodiment includes a ceiling interior material (3) that covers a curtain shield airbag (2) with a terminal side (3a); an assist grip (11) attached to a body panel (12) through attachment hole (9a, 9b) formed in the ceiling interior material (3); an attachment portion (17a, 17b) provided on the assist grip (11), the attachment portion (17a, 17b) being in contact with or facing to outer circumference of the attachment hole (9a, 9b) on a surface of the ceiling interior material (3) in a vehicle cabin side; and an annular groove (20a, 20b, 20a', 20b') on the outer circumference of the attachment portion (17a, 17b) on a surface of the ceiling interior material (3) in a vehicle cabin outer side in such a manner that the groove surround the attachment portion (17a, 17b) (Refer to, for example, FIG. 2, FIG. 3, and FIG. 5).

In the vehicle ceiling structure in accordance with this embodiment, for example, a coupling groove (21a, 21b, 21b') for coupling the pair of annular grooves (20a, 20b, 20a', 20b') arranged on the side of the outer circumferences of the pair of attachment portions (17a, 17b) provided at the assist grip (11) may be formed on the surface of the ceiling interior material (3) in the vehicle cabin outer side (Refer to, for example, FIG. 3 and FIGS. 5A to 5C).

In the above-mentioned embodiment, for example, the coupling groove may include a first coupling groove (21a) for coupling the pair of annular grooves (20a, 20b, 20a', 20b') to each other on the terminal side (3a) of the ceiling interior material (3) (Refer to, for example, FIG. 3 and FIGS. 5A to 5C).

Figure 5A:
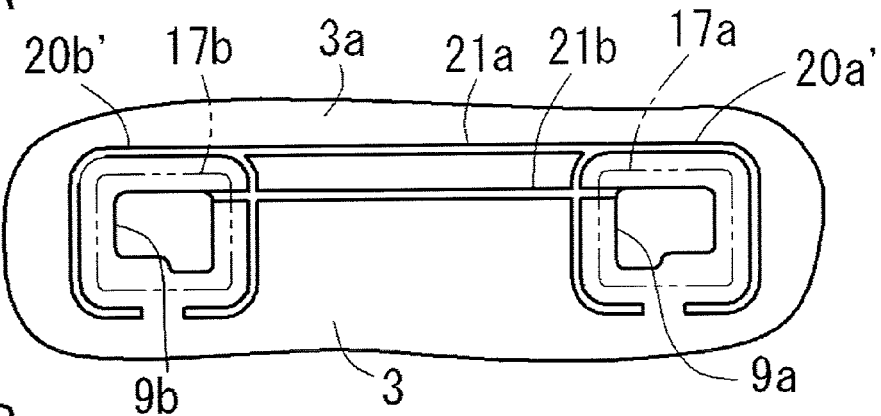
FIGS. 5A-5D are explanatory views showing other modes of the vehicle ceiling structure.
Figure 5B:
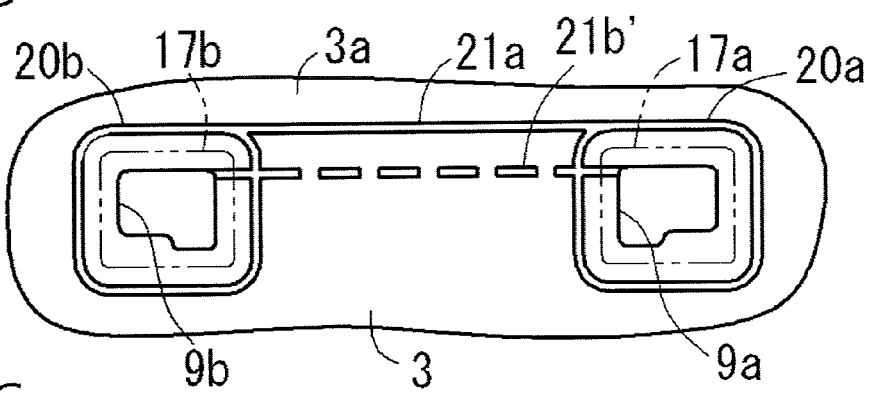

In the above-mentioned embodiment, for example, the coupling groove may include the first coupling groove (21a) and a second coupling groove (21b, 21b') for coupling the pair of annular grooves (20a, 20b, 20a', 20b') to each other on the inner side of the ceiling interior material (3) than the first coupling groove (Refer to, for example, FIG. 3 and FIGS. 5A and 5B). In this case, for example, the second coupling groove (21b, 21b') may be connected to the pair of attachment holes (9a, 9b) of the ceiling interior material (3) (Refer to, for example, FIG. 3 and FIGS. 5A and 5B). Thereby, stress concentration at bending of the ceiling interior material can be further prevented.

Each of the annular grooves and the coupling groove may have a width of 1.0 to 2.0 mm (preferably, 1.0 to 1.5 mm). Each of the annular grooves and the coupling groove may have a depth of 0.5 to 2.0 mm (preferably, 0.5 to 1.0 mm).

Working Example

A working example of the present invention will be specifically described with reference to drawings.

(1) Configuration of Vehicle Ceiling Structure

Figure 1:
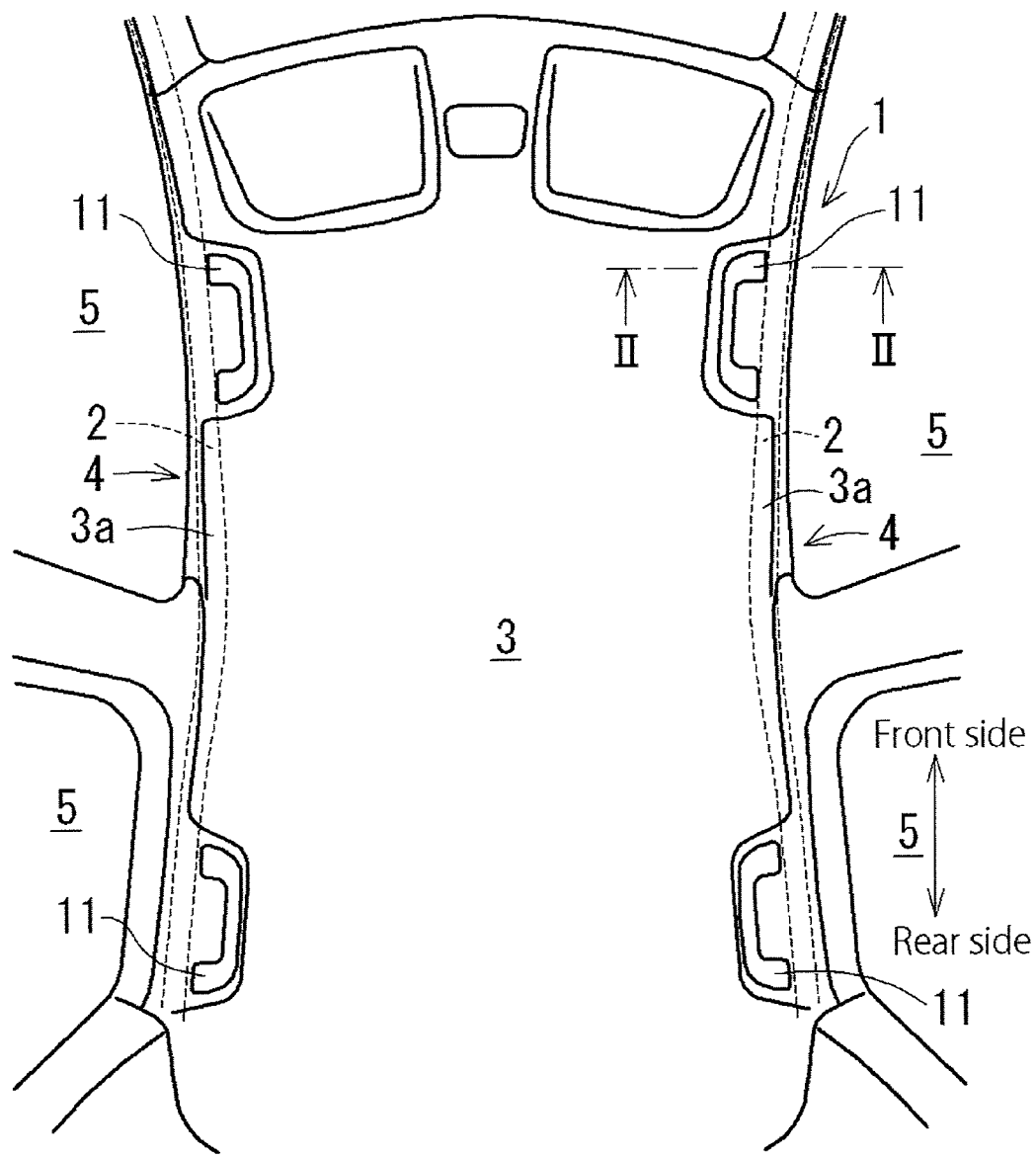
FIG. 1 is a schematic view showing a vehicle ceiling structure in accordance with a working example when viewed from the vehicle cabin side.

A vehicle ceiling structure 1 in this working example, as shown in FIG. 1, includes a ceiling interior material 3 that covers a curtain shield air bag 2 with a terminal side 3a. The curtain shield air bag 2 is folded along a vehicle roof side portion 4 for storage, and expands at collision so as to cover a side window 5.

As shown in FIG. 2, the ceiling interior material 3 includes a base material 7 formed of a fibrous layer or the like, and a skin 8 made of a knit or the like, which is layered on the surface of the base material 7 and becomes a design surface (that is, a surface in a vehicle cabin side). An assist grip 11 is attached to a metal bracket 10 through the pair of attachment holes 9a and 9b in the terminal side 3a of the ceiling interior material 3. The bracket 10 is fixed to a metal body panel 12 arranged in the vehicle cabin outer side of the ceiling interior material 3. A reference numeral 6 in FIG. 2 denotes a rubber weather strip.

As shown in FIG. 2, the assist grip 11 includes a long resin grip body 14, and a pair of resin base members 15 having a support shaft 15a for axially supporting both ends of the grip body 14. Resin cylindrical attachment portions 17a and 17b are attached to the respective base members 15 via a metal clip 16 engaged with an attachment hole 10a formed in the bracket 10. The attachment portions 17a and 17b are in contact with outer circumferences of the attachment holes 9a and 9b on the surface of the ceiling interior material 3 in the vehicle cabin outer side.

As shown in FIGS. 2 and 3, the ceiling interior material 3 on the surface thereof in the vehicle cabin side has a pair of annular grooves 20a and 20b on the outer circumferences of the pair of attachment portions 17a and 17b of the assist grip 11, respectively. The annular grooves 20a and 20b are formed in a closed-loop form so as to surround the attachment portions 17a and 17b, respectively. The annular grooves 20a and 20b each have a width of about 1.0 mm, and a depth of about 0.5 mm.

Figure 4A:
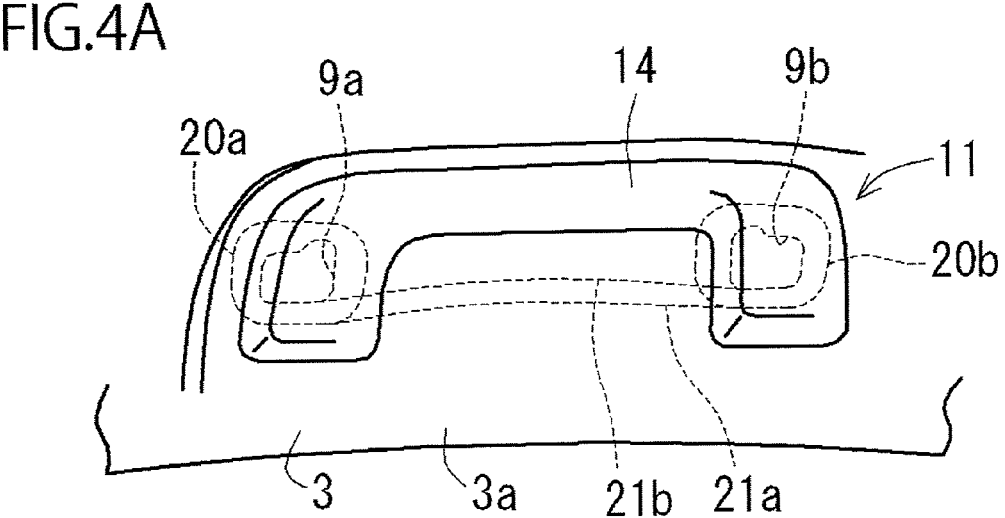
FIGS. 4A and 4B are explanatory views showing an action of the vehicle ceiling structure.
Figure 4B:
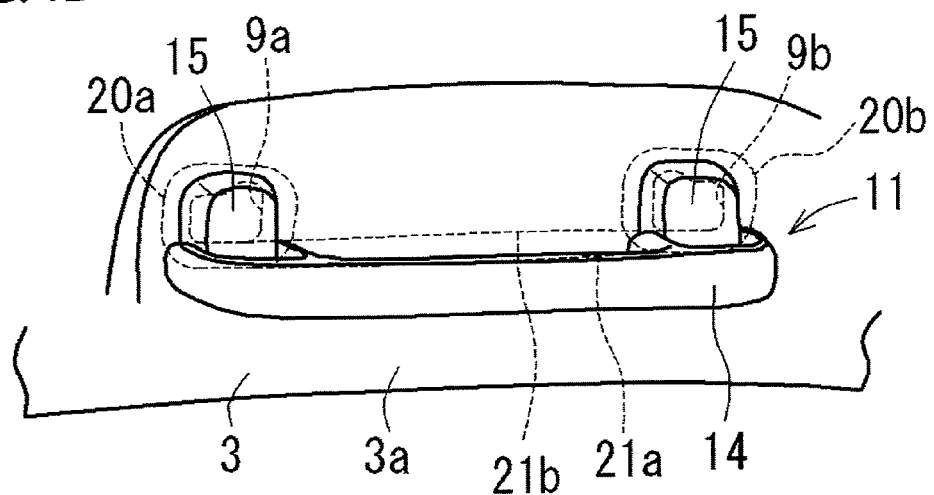

As shown in FIG. 3, the ceiling interior material 3 in the surface thereof in the vehicle cabin outer side also has a first coupling groove 21a and a second coupling groove 21b that couple the pair of annular grooves 20a and 20b to each other. The first coupling groove 21a couples the pair of annular grooves 20a and 20b on the terminal side 3a of the ceiling interior material 3 (Refer to FIG. 4). The second coupling groove 21b couples the pair of annular grooves 20a and 20b to each other on the inner side (that is, the side closer to the center of the ceiling interior material 3) of the ceiling interior material 3 than the first coupling groove 21a (Refer to FIG. 4). The coupling grooves 21a and 21b extend in the forward and rearward direction of the vehicle. The coupling grooves 21a and 21b each have a width of about 1.0 mm, and a depth of about 0.5 mm. Both longitudinal ends of the second coupling groove 21b are connected to the pair of attachment holes 9a and 9b.

(2) Action of Vehicle Ceiling Structure

Next, the action of the vehicle ceiling structure 1 having the configuration will be described. When the terminal side 3a of the ceiling interior material 3 opens toward the vehicle cabin side at expansion of the curtain shield air bag 2, the ceiling interior material 3 bends about the first coupling groove 21a (Refer to FIG. 3), and starts to bend along the pair of annular grooves 20a and 20b (Refer to a broken line in FIG. 2). Then, the terminal side 3a of the ceiling interior material 3 further opens toward the vehicle cabin side, the ceiling interior material 3 bends along the second coupling groove 21b (Refer to FIG. 3) and interferes with outer edges of the attachment portions 17a and 17b, resulting in that the cabin side portion of the ceiling interior material 3 from the annular grooves 20a and 20b bends toward the vehicle cabin outer side in the cylindrical form to increase the diameter of the attachment holes 9a and 9b (Refer to a dot-and-dash line in FIG. 2). Then, the cylindrical bent portions of the ceiling interior material 3 slide on the attachment portions 17a and 17b, and the ceiling interior material 3 escapes from the attachment portions 17a and 17b of the assist grip 11 (Refer to a chain double-dashed line in FIG. 2).

During non-expansion of the curtain shield air bag 2, both in the state where the assist grip 11 is stored (Refer to FIG. 4A) and in the state the assist grip 11 is used (Refer to FIG. 4B), the annular grooves 20a and 20b and the coupling grooves 21a and 21b on the surface of the ceiling interior material 3 in the vehicle cabin side are not seen from the vehicle cabin side.

(3) Effects of Working Example

As described above, in the vehicle ceiling structure 1 in this working example, the annular grooves 20a and 20b on the outer circumferences of the attachment portions 17a and 17b of the assist grip 11 are formed on the surface of the ceiling interior material 3 in the vehicle cabin outer side in such a manner that the annular grooves surround the attachment portions 17a and 17b. Therefore, at expansion of the curtain shield air bag 2, when the terminal side 3a of the ceiling interior material 3 opens toward the vehicle cabin side, the ceiling interior material 3 bends along the annular grooves 20a and 20b, and the cabin side portion of the ceiling interior material 3 from the annular grooves 20a and 20b bends toward the vehicle cabin outer side in the cylindrical form.

Thereby, the attachment holes 9a and 9b expand in diameter stably, causing the ceiling interior material 3 to escape from the attachment portions 17a and 17b of the assist grip 11 smoothly. This can prevent the excessive stress from concentrating on the assist grip 11. Further, since the annular grooves 20a and 20b and the coupling grooves 21a and 21b on the surface of the ceiling interior material 3 in the vehicle cabin side are not seen from the vehicle cabin side, the appearance of the ceiling interior material 3 around the assist grip 11 can be improved.

In this working example, the coupling grooves 21a and 21b for coupling the pair of annular grooves 20a and 20b arranged on the outer circumferences of the pair of attachment portions 17a and 17b provided at the assist grip 11 are formed on the surface of the ceiling interior material 3 in the vehicle cabin outer side. Therefore, the ceiling interior material 3 bends along the coupling grooves 21a and 21b, and thus, bends along the pair of annular grooves 20a and 20b.

In this working example, the first coupling groove 21a for coupling the pair of annular grooves 20a and 20b to each other on the terminal side 3a of the ceiling interior material 3 is provided. Therefore, the ceiling interior material 3 easily bends about the first coupling groove 21a, and further bends along the pair of annular grooves 20a and 20b more reliably. Thus, the pair of attachment holes 9a and 9b expands in diameter more stably, causing the ceiling interior material 3 to escape from the pair of attachment portions 17a and 17b of the assist grip 11 more smoothly.

In this working example, the first coupling groove 21a and the second coupling groove 21b for coupling the pair of annular grooves 20a and 20b to each other on the inner side of the ceiling interior material than the first coupling groove 21a are provided. Therefore, the ceiling interior material 3 bends along the first coupling groove 21a as well as the second coupling groove 21b. Thus, at expansion of the air bag, the bending stress that cannot be received by the first coupling groove 21a can be supplementarily received by the second coupling groove 21b.

The present invention is not limited to the above working example, and may be variously changed within the scope of the present invention according to objects and applications. That is, in the working example, the annular grooves 20a and 20b formed in the shape of a closed-loop so as to surround the attachment portions 17a and 17b, respectively, are exemplified. However, the present invention is not limited to this, and for example, as shown in FIG. 5A, annular grooves 20a' and 20b' partially broken so as to surround the attachment portions 17a and 17b, respectively, may be adopted. In this case, it is preferred that the broken portions of the annular grooves 20a' and 20b' are provided on the opposite side to the terminal side 3a of the ceiling interior material 3.

In the working example, the continuously-extending second coupling groove 21b is exemplified. However, the present invention is not limited to this, and for example, as shown in FIG. 5B, a partially broken second coupling groove 21b' may be adopted.

Figure 5C:
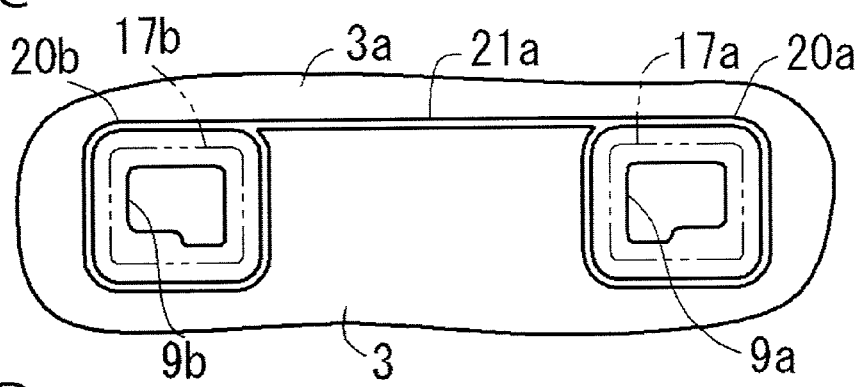
Figure 5D:
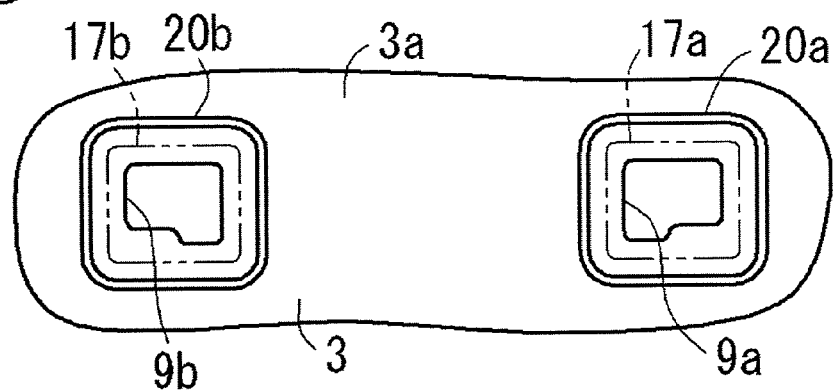
Figure 6A:
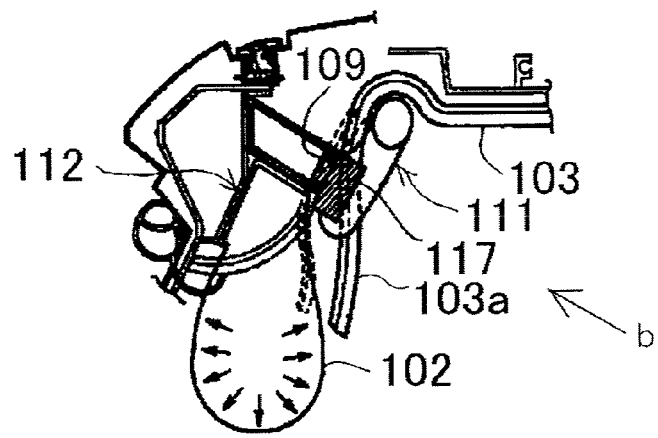
FIGS. 6A and 6B are explanatory views showing a conventional vehicle ceiling structure.
Figure 6B:
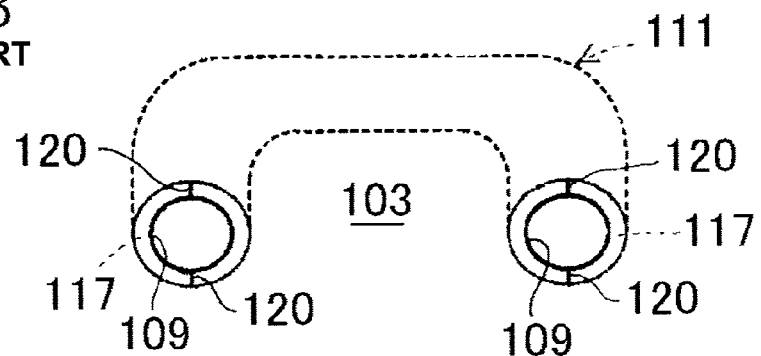
Figure 7:
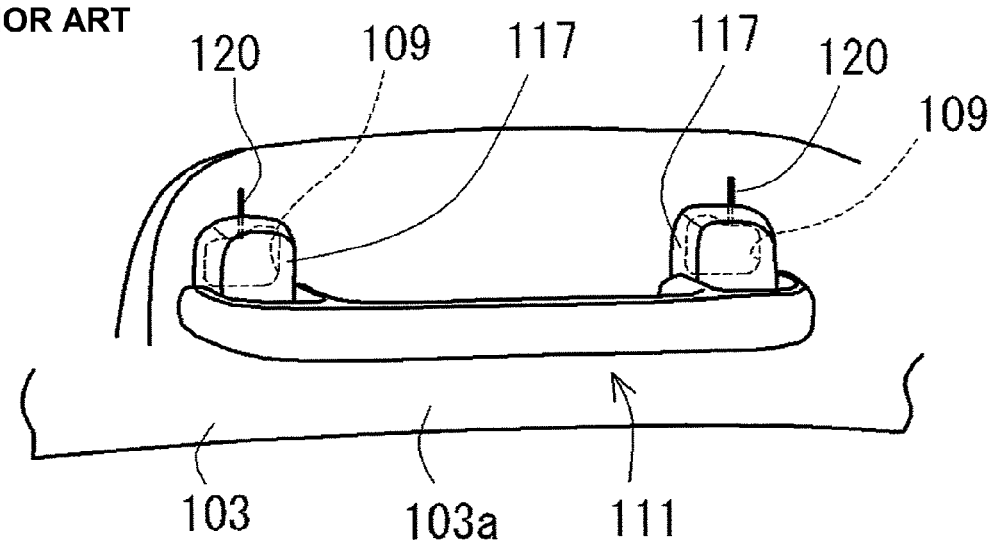
FIG. 7 is an explanatory view showing a conventional vehicle ceiling structure.

In the working example, the first and second coupling grooves 21a and 21b are provided. However, the present invention is not limited to this, and for example, as shown in FIG. 5C, only the first coupling groove 21a may be provided, or three or more coupling grooves may be provided. Alternatively, as shown in FIG. 5D, only the annular grooves 20a and 20b may be provided without the coupling groove.

In the working example, the assist grip 11 is attached to the body panel 12 via the bracket 10. However, the present invention is not limited to this, and for example, the assist grip 11 may be directly attached to the body panel 12.

In the working example, the attachment portions 17a and 17b of the assist grip 11 are brought into contact with the surface of the ceiling interior material 3 in the vehicle cabin side. However, the present invention is not limited to this, and for example, the attachment portions 17a and 17b of the assist grip 11 may be facing to the surface of the ceiling interior material 3 in the vehicle cabin side.

In the working example, the rotational assist grip 11 that become available by rotating the grip body 14 is exemplified. However, the present invention is not limited to this, and for example, an assist grip that become available by pulling out the grip body may be adopted.

In the working example, the ceiling interior material 3 including the plurality of assist grips 11 is exemplified. However, the present invention is not limited to this, and for example, the ceiling interior material may only include at least one assist grip.

The present invention can be widely applied to vehicle ceiling structures including passenger cars, buses, and trucks; rail cars such as trains and steam trains; construction vehicles; agricultural vehicles; and industrial vehicles.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiments, and various variations and modifications may be possible without departing from the scope of the present invention.

What is claimed is:

1. A vehicle ceiling structure comprising:
   a ceiling interior material that covers a curtain shield air bag with a terminal side;
   an assist grip attached to a body panel through an attachment hole provided in the ceiling interior material; and
   an attachment portion provided on the assist grip, the attachment portion being in contact with or facing towards an outer circumference of the attachment hole in a surface of the ceiling interior material in a vehicle cabin side,
   wherein the ceiling interior material on a surface thereof in a vehicle cabin outer side has an annular groove facing the outer circumference of the attachment portion such that the annular groove surrounds the attachment portion and has a coupling groove that connects a pair of annular grooves that face the outer circumferences of the a pair of the attachment portions provided at the assist grip.

2. The vehicle ceiling structure according to claim 1, wherein the coupling groove includes a first coupling groove that connects the pair of annular grooves to each other on the terminal side of the ceiling interior material.

3. The vehicle ceiling structure according to claim 2, wherein the coupling groove includes the first coupling groove and a second coupling groove that connects the pair of annular grooves to each other on the inner side of the ceiling interior material closer to the attachment portion than the first coupling groove.

4. The vehicle ceiling structure according to claim 3, the first coupling groove connects the annular grooves and the second coupling groove connects to an attachment hole of the attachment portion.

5. The vehicle ceiling structure according to claim 3, one of the coupling grooves being configured as a partially broken coupling groove.

6. The vehicle ceiling structure according to claim 1, the coupling groove comprising an extension of a pair of annular grooves.

7. The vehicle ceiling structure according to claim 1, the annular groove is configured to allow the ceiling interior material to bend without breaking.

8. The vehicle ceiling structure according to claim 7, the coupling groove is configured to allow the ceiling interior material to bend without breaking.

* * * * *